Nov. 25, 1952 J. MANN 2,619,036
WATER SYSTEM
Filed Sept. 1, 1945 6 Sheets-Sheet 1

INVENTOR.
John Mann
BY

Nov. 25, 1952     J. MANN     2,619,036
WATER SYSTEM

Filed Sept. 1, 1945     6 Sheets-Sheet 2

INVENTOR.
John Mann
BY

Nov. 25, 1952  J. MANN  2,619,036
WATER SYSTEM
Filed Sept. 1, 1945  6 Sheets-Sheet 3
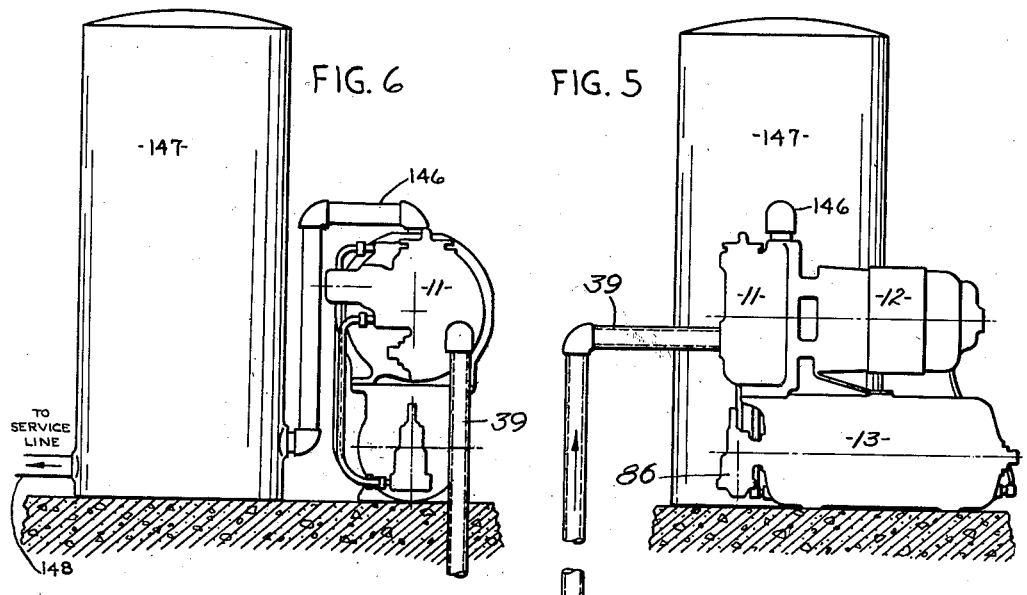
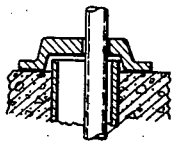
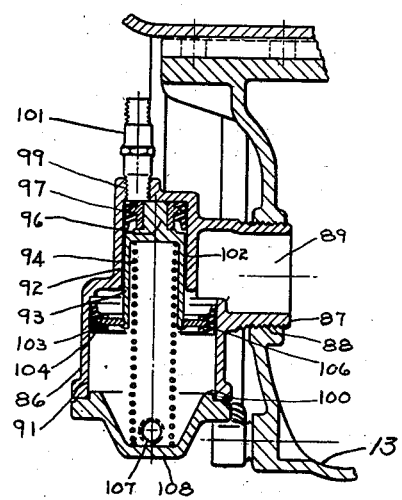
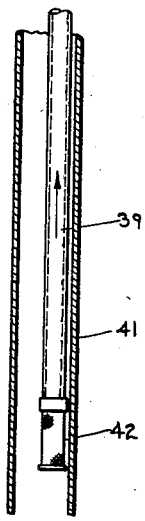
INVENTOR.
John Mann
BY Nov. 25, 1952    J. MANN    2,619,036
WATER SYSTEM
Filed Sept. 1, 1945    6 Sheets-Sheet 4
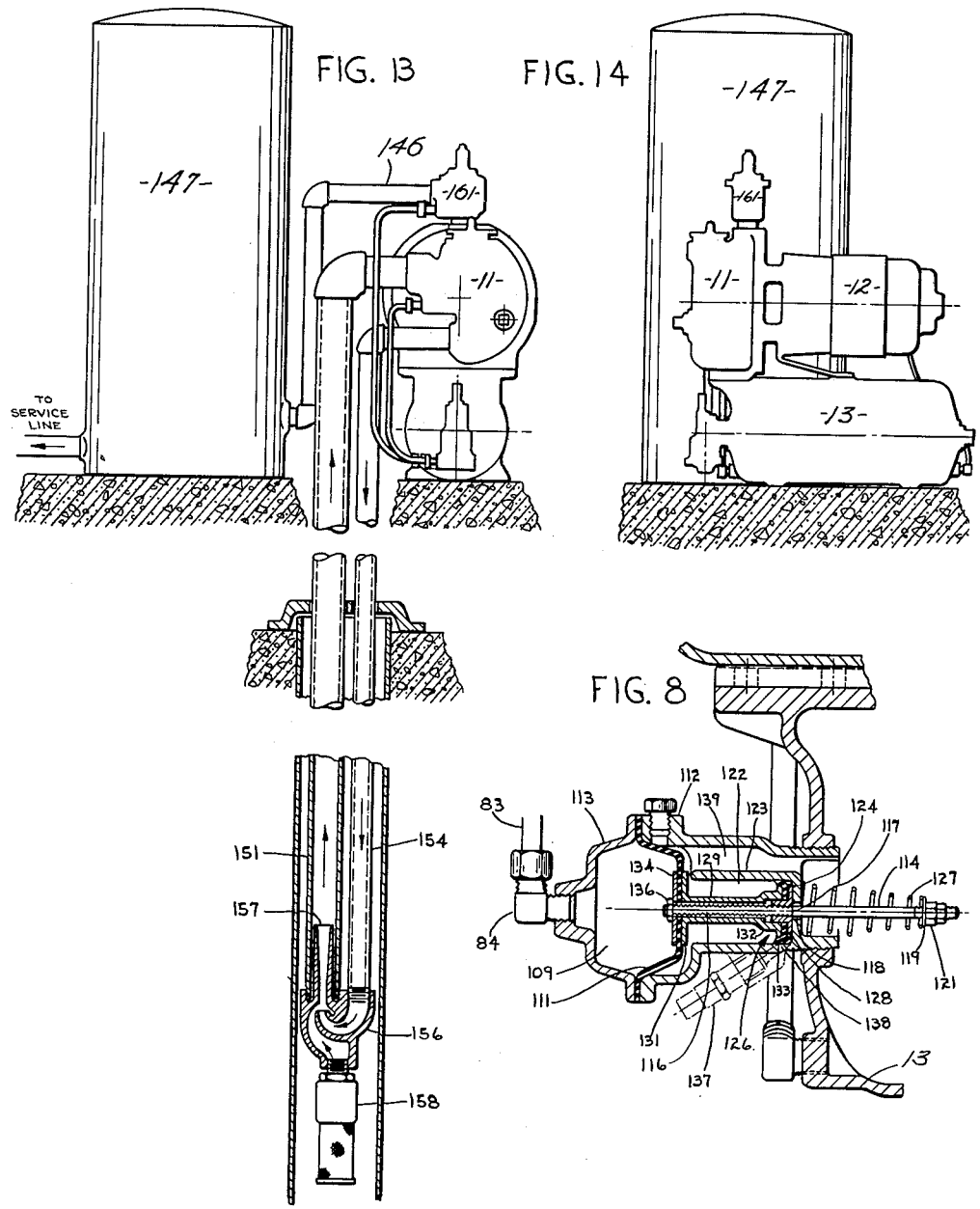
INVENTOR.
John Mann
BY Nov. 25, 1952   J. MANN   2,619,036
WATER SYSTEM
Filed Sept. 1, 1945   6 Sheets-Sheet 5

INVENTOR.
John Mann
BY

FIG. 11
FIG. 12
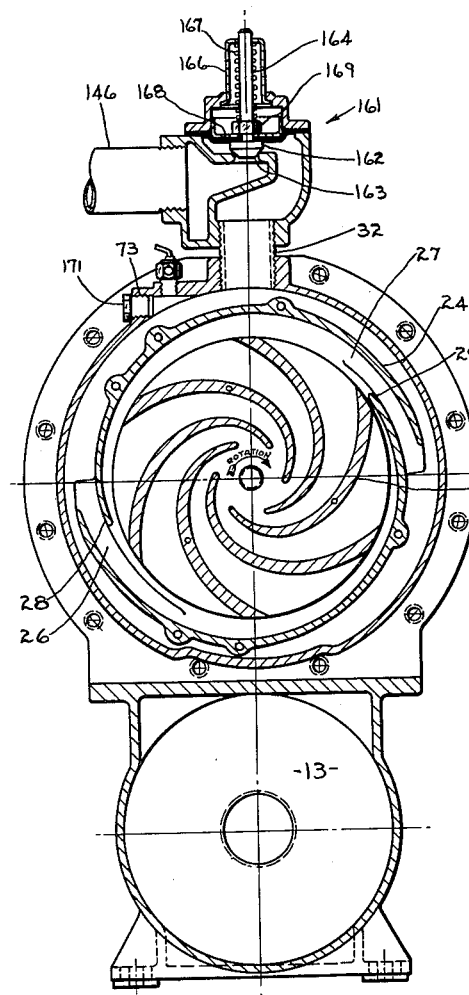
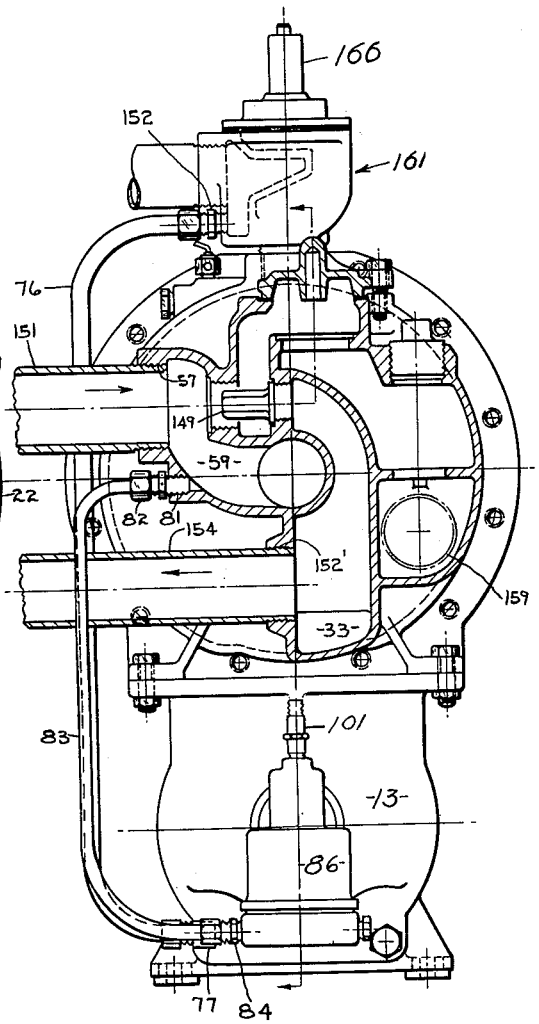
INVENTOR.
John Mann

Patented Nov. 25, 1952

2,619,036

UNITED STATES PATENT OFFICE 2,619,036

WATER SYSTEM

John Mann, Seneca Falls, N. Y., assignor to Goulds Pumps, Inc., Seneca Falls, N. Y., a corporation of New York Application September 1, 1945, Serial No. 614,052

10 Claims. (Cl. 103—5)

My invention relates to water systems and more particularly to a water system of the jet centrifugal type adapted particularly for domestic water supply. This application is a continuation in part of applicant's co-pending application Serial No. 577,879, filed February 14, 1945, now issued as Patent No. 2,440,611, dated April 27, 1948.

An object of my invention is to provide a compact, simplified and economical water system of the jet centrifugal type.

Another object of my invention is to provide a water system which may be readily converted into a straight centrifugal pump, a water system of the shallow well jet centrifugal type or a deep well water system of the jet centrifugal type.

Another object of my invention is to provide a water system of the jet centrifugal type in which under a major portion of the conditions of operation encountered, the conventional large pneumatic storage tank is not required.

A further object of my invention is to provide an improved air supplier or air pump for supplying air either to a small pneumatic chamber or to a large pneumatic storage tank should one be employed with the system.

My invention further contemplates the provision of a jet centrifugal type water system in which a small pneumatic chamber floats on the line between the centrifugal pump discharge and the house service lines so that water flows directly from the centrifugal pump to the house service lines under most conditions of operation, and at the same time the small pneumatic chamber provides the necessary air cushion for the system.

Other objects and advantages of my invention will be apparent from the following description, when taken in connection with the accompanying drawings, in which:

Fig. 5 is a view of the jet centrifugal unit arranged for shallow well operation;

Fig. 6 is an end elevation of Fig. 5;

Fig. 7 is a sectional view showing one type of air supplier or air pump which may be used with the water system of my invention;

Fig. 8 is a sectional view similar to Fig. 7 showing a modified form of air supplier or air pump;

Fig. 11 is a sectional view taken substantially on the line 11—11 of Fig. 10;

Fig. 12 is a sectional view taken substantially on the line 12—12 of Fig. 10;

Fig. 13 is a view showing the system arranged for deep well operation and employing a conventional large pneumatic storage tank; and Fig. 14 is a side elevation of Fig. 13.

Figure 1:
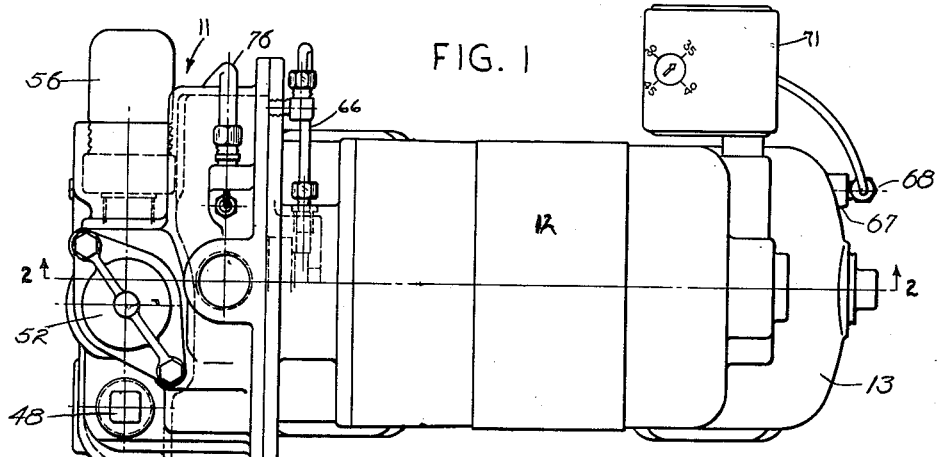
Fig. 1 is a top plan view of the water system of my invention with the system being arranged for shallow well operations.

The water system of my invention comprises a pump assembly 11, a driving motor 12 for the pump and a pneumatic pressure chamber 13. In the drawings I have shown a rotatable pump impeller 14 of the centrifugal, preferably closed vane type although it will be appreciated that other types of pumps may be employed. The impeller is mounted on the end of a shaft 16 which is an extension of the motor shaft. An adapter 17 lies or is mounted between the end of the motor and the pump assembly to which the pump assembly is bolted as indicated at 18.

While I have shown the pump impeller mounted on an extension of the motor shaft it will of course be appreciated that this is optional. If desired, an entirely separate pump and motor may be employed in which the impeller is mounted on its own shaft and the impeller shaft and motor shaft are connected in driving relation by means of a flexible coupling.

The pump assembly is bolted to the upper wall of the pressure chamber, as indicated at 19, and the motor has a bracket 21 extending to and carried by the pressure chamber to assist in supporting the motor. In this arrangement the pressure chamber not only serves to provide a small reserve supply of liquid under pressure, as will be more fully explained later, but also serves as a mounting base for the pump and motor.

Figure 3:
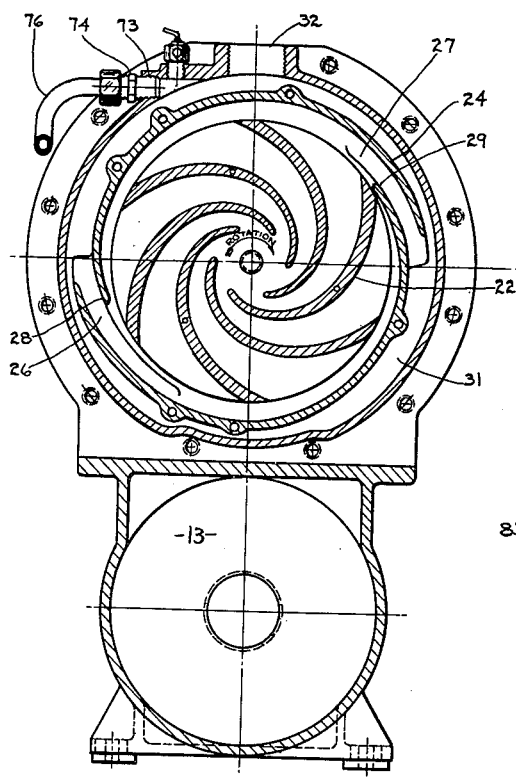
Fig. 3 is a sectional view taken substantially on the line 3—3 of Fig. 2 in the direction indicated by the arrows.

The centrifugal pump is preferably of the self-priming type shown in my copending application Ser. No. 595,019, filed May 21, 1945. The impeller has a series of curved vanes 22 (Fig. 3) and the impeller is mounted in a casing 24 which has two discharge volutes 26 and 27. The cutwaters 28 and 29 of these volutes are differently spaced from the periphery of the impeller for the purposes fully set forth in the above mentioned copending application.

Figure 2:
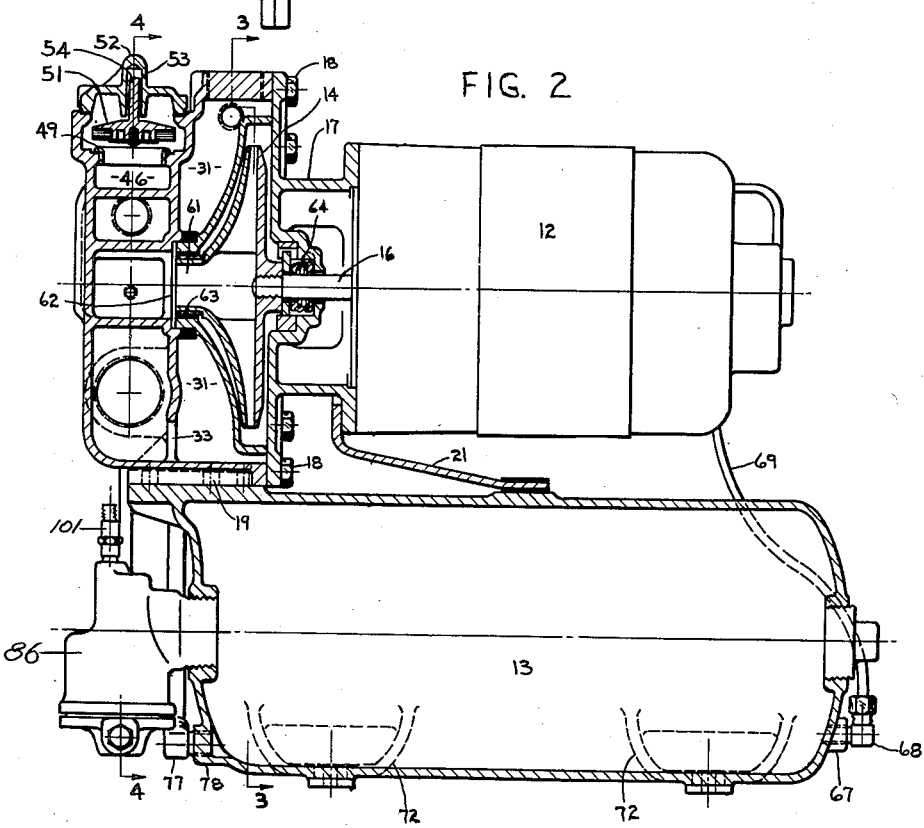
Fig. 2 is a vertical sectional view taken substantially on the line 2—2 of Fig. 1 in the direction indicated by the arrows.

Liquid is discharged from the centrifugal pump through the volute passages 26 and 27 to an air separating chamber 31, shown most clearly on Fig. 2. The purpose of the air separating chamber is to slow down the velocity of the liquid and permit air and liquid separation to take place within the chamber. The air passes out through a discharge opening 32 with the main body of the liquid which flows from the discharge outlet to the point of use of the liquid as, for example, the service lines of a house.

Substantially air free liquid flows from the bottom of the air separating chamber through an opening 33 (Figs. 2 and 4) into a passage 34. This liquid is usually under pressure, the pressure range usually employed in water systems with which my invention is concerned being between 20 and 35 or 20 and 40 pounds. The pressures employed and the differential in pressure or pressure range of the system may of course be varied to suit particular conditions encountered. Liquid flows through the passage 34 to a nozzle 36 which is screwed into a threaded bore formed in the walls defining the passage 34. The nozzle is in axial alignment with a diffuser 37, the nozzle and diffuser constituting the elements of a jet pump the function of which is well known in the art to which this invention applies.

A space 38 extends around the end of the nozzle and the entrance opening into the diffuser through which liquid from the source of supply is drawn by reason of the suction effect of the centrifugal pump and the sub-atmospheric pressure created by the flow of liquid at high velocity through the nozzle into the diffuser. In Fig. 5 I have shown a tail pipe 39 extending into a well 41 the tail pipe having at the end thereof the usual strainer 42. The lower end of the tail pipe may be equipped with a foot valve if desired. However, as will presently appear, a foot valve is unnecessary with the water system of my invention.

Liquid is forced, by the atmospheric air pressure prevalent on the surface of the liquid in the well, when a sub-atmospheric pressure is existent in the space 38 and this liquid flows into the compartment 43 of the pump. The entering liquid flows through a strainer 44 into a passage 46. The casting which houses the pump assembly is provided with a threaded bore 47 for the reception of the plug 48. Upon removal of the plug the strainer 44 may be removed for replacement or cleaning.

Formed in the casting is a bore which is provided with an annular valve seat 49. A check valve 51 of any suitable type is adapted to close the opening from the passage 46 when the pump is stopped so as to retain liquid in the pump. It will be apreciated that the valve is opened and maintained open by the lesser pressure on the upper side of the valve when the pump is running. When the pump is stopped, the pressures, on the opposite sides of the centrifugal pump impeller equalize thereby resulting in a greater pressure on the upper side of the valve closing the valve immediately. Assuming no leakage through the valve or in the suction pipe, liquid will remain in the suction passages and pipe almost at the level of the valve, after the pump stops.

The casting is provided with an opening which is closed by a cap 52 bolted in position. The cap has a boss which is provided with a bore 53. The valve 51 is provided with a stem 54 which slides loosely in the bore 53 and is guided to its seat by the margins thereof. While I have shown the valve as seating by gravity, it will of course be appreciated that a spring may be employed to assist the valve in returning to its seat.

It will be particularly noted that the valve 51 is located adjacent the top of the pump assembly. When the pressure in the system reaches the upper limit for which the pressure switch is set, as will presently appear, and pump operation is discontinued the valve automatically closes, due to the pressure on the top surface of the valve. Liquid is trapped in the pump casing, air separating chamber and the passages associated therewith. Thus liquid from the well or other source of supply is drawn into the system through the suction pipe and valve opening and into the space 38.

A removable cap 56 is screwed into a threaded bore 57 formed in the casting and liquid discharged from the diffuser flows through the space 58 between the outer walls of the diffuser and the inner walls of the cap 56. This liquid then flows through a passage 59 and enters the eye 61 of the impeller 14 through an opening 62 in the casting.

The pump impeller is provided adjacent the outer cylindrical wall forming the eye with a seal 63 to minimize flow of liquid from the discharge side of the pump to the suction side thereof. Around the shaft 16 on the rearward side of the impeller there is provided a mechanical seal, generally indicated by the numeral 64, the details of which are no part of my present invention. If desired, instead of a mechanical seal the more conventional stuffing box and packing may be employed for sealing the shaft at this point. As shown in Fig. 1, a connection 66 is preferably provided which supplies liquid under pressure to the mechanical shaft seal. This connection extends to the pressure side of the pump.

The pressure chamber 13 may be a casting or sheet metal chamber of relatively small capacity. For example, the chamber may be of sufficient capacity to permit a draw off of as little liquid as approximately one quart. I have found, with a properly designed water system, that in a major portion of installations of jet pumps the conventional large pneumatic storage tank for liquid is not necessary. For the most part where the well is capable of supplying liquid in excess of the capacity of the water system, a large pneumatic storage tank is not essential and the liquid in the well becomes the reserve supply. The outlet 32 may then be directly connected to the piping constituting the house service lines or the supply system for any other building or purpose. Where a large pneumatic storage tank is unnecessary, the pneumatic pressure chamber is primarily for the purpose of protecting the pressure switch and preventing the system from starting and stopping too frequently.

The pressure chamber has a boss 67 which is provided with a bore for the reception of a fitting 68. A tube extends to a pressure switch 71, the details of which are shown in my copending application Serial No. 645,995, filed February 7, 1946, and entitled "Water System and Method of Control Therefor," now abandoned. It is sufficient for the purpose of setting forth clearly this invention, to mention that the pressure switch is adjustable to adjust the upper limit of pressure at which the pressure switch causes the motor to shut off. This may be in the neighborhood of 35 pounds. The range of pressure preferably employed is such as to cause the pump to start again when the pressure in the system drops to 22 or 23 pounds. These pressures including the range between the upper and lower limits, are variable and will depend to a certain extent upon the conditions encountered in the particular installation.

The pressure chamber is provided with extensions or feet 72 which form a plurality of enlarged planary surfaces adapted to rest on or be secured to a floor or other suitable support. The pressure chamber thus serves as a bed plate for the motor and pump assembly.

One of the important features of the water system of my invention lies in the fact that when the pump is operating, for the most part the liquid is discharged by the centrifugal pump directly to the point of use and need not pass through the pressure chamber. In the systems of the prior art with which I am familiar the liquid, prior to passing to the house service lines, flows through the pneumatic storage tank. In the system of my invention the pressure chamber may be said to "float" on the line. This is accomplished by providing a threaded bore 73 (Figs. 3 and 4) adjacent the discharge opening 32 into which is threaded a fitting 74. A tube 76 of relatively small diameter extends from the fitting to a similar fitting 77 adjacent the bottom of the pressure chamber. The pressure chamber is provided with a boss 78 which has a threaded bore for the reception of the fitting 77.

Let us now assume that the pump is not operating and that the system is at a pressure of 35 pounds, the pressure at which the pressure switch is set to cut the motor out. Now when a demand for liquid occurs, occasioned for example by the turning on of a house faucet, liquid is withdrawn from the pressure chamber through the tube 76 and into the air separating chamber adjacent the outlet 32. From thence such withdrawn liquid flows to the point of use. As soon as the pressure has dropped in the system an amount sufficient to actuate the pressure switch, or the pressure for which it is set to cut the motor in, for example, 23 pounds, the motor starts and liquid is drawn from the source of supply and discharged directly through the discharge opening 32 to the point of use without passing through the pressure chamber.

The flow of liquid continues as long as a demand exists in the system. However, when the faucet is shut off the pump then continues to operate for a time only sufficient to replace the approximately one quart of liquid withdrawn from the pressure chamber. This liquid flows from the air separating chamber 31 to the pressure chamber through the tube 76. Thus the pressure chamber may be said to "float" on the line since the major portion of the liquid supplied to the house service lines does not pass through the chamber. However, the air cushion maintained therein is effective at all times throughout the system.

Figure 4:
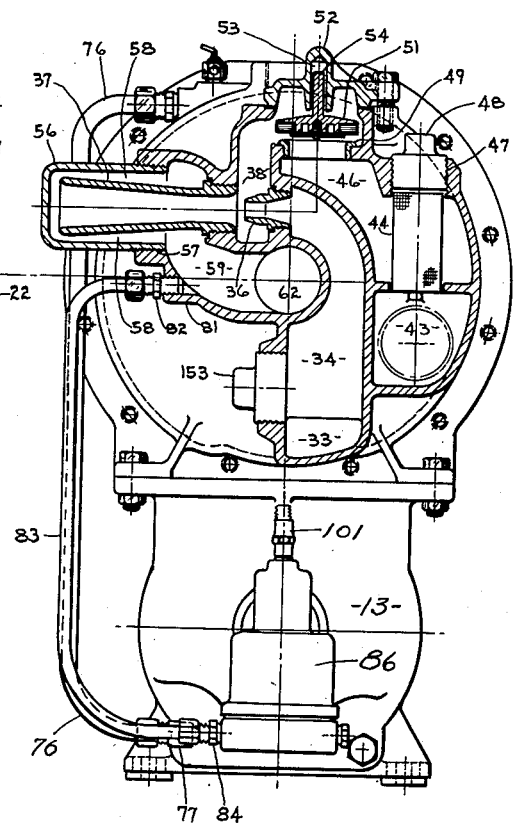
Fig. 4 is a sectional view taken substantially on the line 4—4 of Fig. 2 in the direction indicated by the arrows.
Figures 9, 10:
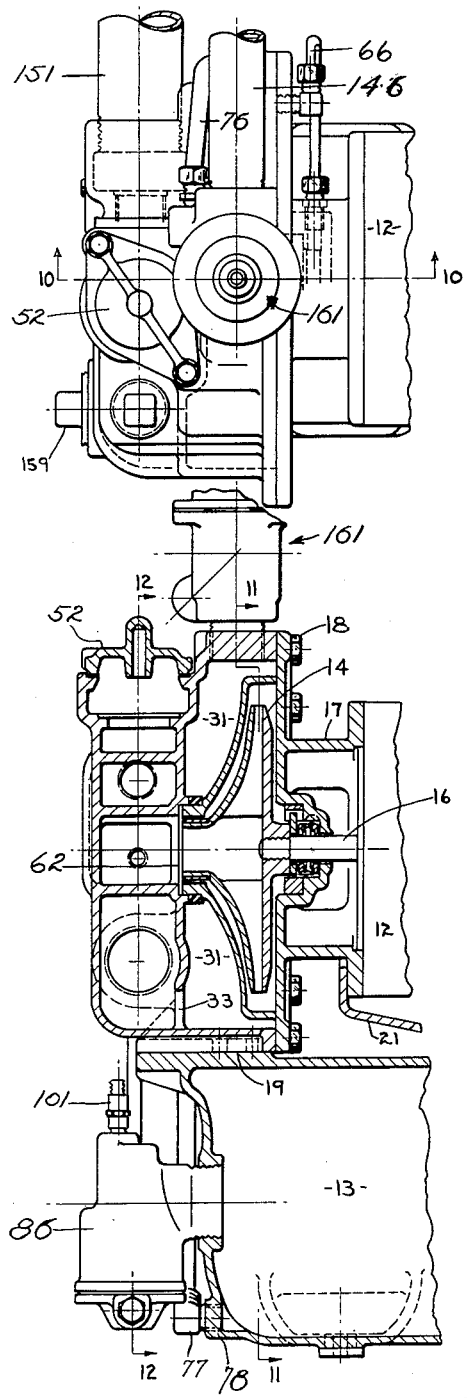
Fig. 9 is a top plan view similar to Fig. 1 showing the system as it is arranged for deep well operation.
Fig. 10 is a vertical sectional view taken substantially on the line 10—10 of Fig. 9 in the direction indicated by the arrows.

The water system of my invention is provided with novel means for maintaining the pressure chamber supplied with air to maintain an air cushion under pressure therein. Referring now to Fig. 4 the casting is provided with a boss 81 which has a threaded bore opening into the passage 59. A threaded fitting 82 is entered in this bore and is connected to a tube 83 which terminates in a fitting 84.

Referring now to Fig. 7, the air supplier or air pump comprises a casing 86 which has a sidewardly extending threaded extension 87. The pressure chamber is provided with a threaded bore 88 into which the extension 87 is fitted. The extension has a passage 89 to which the pressure of air and liquid in the pressure chamber has access. The air pump is provided with a large diameter cylinder 91 and a smaller diameter cylinder 92. A piston 93 is normally urged by a spring 94 in an upward direction, as viewed in Fig. 7, the piston 93 being provided with a bore for the reception of the spring.

The upper end of the piston 93 is provided with a cylindrical extension 96. A sealing element 97 is press fitted on the extension, as shown in the drawings. The sealing element 97 comprises a flanged cylindrical sleeve about which is preferably moulded a flexible rubber or composition sealing material adapted to maintain sealing contact with the cylinder walls when the piston moves downward and allows air to escape past it between it and the cylinder walls when the piston moves upward. The upper end of the cylinder 92 has a threaded bore 99 for the reception of a Schrader type of air valve 101.

When the piston 93 moves downward in the cylinder 92, a sub-atmospheric pressure is created behind the piston 93. To satisfy this partial vacuum, air flows through the Schrader valve 101 and into the cylinder. When the piston moves upward again, the Schrader valve closes and a pressure is created in the cylinder 92 above the piston 93. When the air has been sufficiently compressed, it escapes past the flexible rubber sealing element into an annular passage 102 between the piston and the cylinder walls. This passage is in communication with the passage 89 so that air taken into the cylinder through the Schrader valve is discharged into the pressure chamber.

The lower end of the piston 93 has its margins crimped so as to confine an annular relatively thin metal disk 103. The metal disk 103 is embedded or molded in a piston element 104 which may be of rubber or any other suitable material. The disk 103 and the piston element 104 constitutes a piston, generally indicated by the numeral 106, operable in the cylinder 91. The fitting 84 is entered into a threaded bore 107 provided in a removable cover plate 108 constituting the bottom wall of the cylinder 91. It will be noted that a machined surface is provided on the upper side of the cover plate 108 protruding in the bore of the cylinder 91, as shown at 109, to permit the lower side of the piston element 104 to seat as a valve on this machined surface when the pump system is operating. This is to prevent recirculation of air from the pneumatic chamber 13 through tube 83 to chamber 59 and thence to the impeller in case of a worn or damaged cylinder wall or piston.

The air supplier or air pump is actuated in accordance with the operating and non-operating cycles of the system. That is, the upper side of the piston 106 is exposed to the pressure existent in the pressure chamber 13. This pressure, when the pump is operating, is always the discharge pressure of the pump. The lower side of the piston 106, as previously mentioned, is connected to the suction passage 59.

When the pump is operating this latter pressure is the pressure existent at the suction of the centrifugal pump. This pressure under most conditions of operation is a negative pressure but under some operating conditions may be a positive pressure. That is, the liquid may flow, in some installations, to the centrifugal pump under pressure. However, under all operating conditions the differential in pressure existent on opposite sides of the piston 106 is always the pressure developed by the centrifugal pump. This is always a substantially fixed value. The pressure of the spring 94 and the piston areas are apportioned so that when the pump is operating this differential in pressure on opposite sides of the piston 106 is sufficient to insure that the piston will move to the bottom of the cylinder 91 against the action of the spring 94 when the pump is operating.

When the pressure in the system reaches the upper limit for which the pressure switch has been set and the pump stops, the pressures on opposite sides of the centrifugal pump impeller are equalized due to the reverse flow of liquid through the pump. This equalization of pressures extends through the suction passage 59, the tube 83 and the lower side of the piston 106. That is, the pressures on opposite sides of the piston 106 are equalized thereby causing the spring 94 to actuate the piston assembly and move the pistons to the position shown in Fig. 7, during which operation air drawn through the Schrader valve and occupying the cylinder 92 is forced into the pressure chamber. When the pressure drops again, as a result of opening a faucet in the house supply lines, the pump is started which creates a differential in pressure across the piston 106, as described above. This action draws air in through the Schrader valve which is discharged into the pressure chamber when the pump stops.

The air supplier of Fig. 7 supplies air to the pressure chamber once during each cycle of operation of the unit. The quantity of air supplied, however, is relatively small and is calculated so as to be only slightly in excess of the amount normally absorbed or carried in suspension by the liquid flowing out through the discharge tube 76 during the normal course of operation of the system. Should an excess of air accumulate in the pressure chamber, the normal liquid line therein will lower and this air will be removed from the pressure chamber through the discharge tube 76 during periods when the pressure in the chamber is near its lower limit. That is, when the pressure drops in the chamber 13, the water line recedes toward the level of the boss 78. Under normal conditions of operation the air will not reach the boss but should an excess of air be present in the pressure chamber the water level will reach the boss and air will escape through the tube 76. This air is then discharged from the system through the outlet 32.

In Fig. 8 I have shown a modification of the air supplier above described in which the tube 83 is connected with the suction of the pump as in the previously described arrangement and to a chamber 109 in which a diaphragm or pressure responsive means 111 is operable. The margins of the diaphragm are confined by the flanges formed with a main casing part 112 of the air supplier and a cover part 113. The unit is provided with a stem 114, a part 116 of it being threaded with the threaded portion terminating in a shoulder 117. The stem extends through an opening 118 and the extended end of the stem is threaded for the reception of a spring backing plate 119, and a lock nut assembly 121. A cylinder 122, defined by side walls 123 and bottom wall 124, is cast integral with the main casing part of the air supplier. A piston, generally indicated by the numeral 126, operates in this cylinder. A spring 127 is confined between the backing plate 119 and the bottom wall 124 of the cylinder.

The piston 126 comprises a backing plate 128 which has a threaded boss adapted to be screwed on the threaded part 116 of the stem. A sleeve 129 has a flange 131 at one end and a flange 132 at the other end, which is provided with an enlarged cavity for the reception of the boss of the backing plate 128. A cup crimp 133 is confined between the flange 132 and the backing plate 128. The other end of the shaft is provided with a washer 134. A nut 136 is threaded on the end of a stem and serves to confine the diaphragm 111 between the washer 134 and the flange 131 and the cup crimp 133 between the backing plate 128 and the flange 132.

A Schrader type valve 137 is connected into the main casing part 112 and an opening 138 extends into the cylinder 122 adjacent the bottom wall thereof. A passage 139 provided in the main casing part 112 opens into the pressure chamber and at its other end has access to one side of the diaphragm 111. The spring 127, as will be apparent, normally tends to draw the piston 126 and the diaphragm 111 to the right, as viewed in Fig. 8 against the forces exerted on the opposite sides of the diaphragm and on opposite sides of the piston.

The operation of the air supplier of Fig. 8 is essentially the same as that of Fig. 7 in that when the pump is in operation the right hand side of the diaphragm 111 is exposed to the pressure existent on the discharge side of the impeller. Thus, when the pump is in operation, there is a definite difference in pressure on opposite sides of the diaphragm which is the pressure across the impeller. The areas of the opposite sides of the diaphragm and the opposite sides of the piston are such, and the differential in pressure on opposite sides of the diaphragm is such as to shift the diaphragm, together with the piston, to the left, as viewed in Fig. 8, when the pump is in operation. The margins of the opening 118 have a limited clearance around the stem so as to provide a restricted orifice between the pressure chamber and the cylinder 122. The level of this restricted orifice determines the normal liquid level in the pressure chamber 13.

If when the piston 126 moves to the left, as viewed in Fig. 8, air is at the level of the restricted orifice defined by the clearance existent at the opening 118, air drawn from the pressure chamber fills the space left by the receding piston. That is, the Schrader valve requires a certain sub-atmospheric pressure existent in the cylinder 122 before it opens. However, air flows through the restricted orifice to satisfy this sub-atmospheric pressure before the Schrader valve can open. Therefore, the air in the cylinder 122 is air withdrawn from the air pressure chamber and, when the pump is stopped and the spring 127 restores the piston to its normal position, this air is returned to the pressure chamber and no additional air is supplied thereto.

However, should the water line be above the restricted orifice, defined by the opening 118, air will be admitted through the Schrader valve 137 more rapidly than the flow of liquid through the restricted orifice can satisfy the sub-atmospheric pressure existent behind the piston. When the pump is stopped again this air is forced through the restricted orifice or escapes to the left past the cup crimp. In either case this air gains access to the pressure chamber. Thus air is supplied to the pressure chamber only in accordance with whether air is required therein to maintain the normal desired liquid level.

In a major portion of the installations a large pneumatic storage tank, conventionally employed in water systems, is not necessary. Thus, for example, in a large number of wells the flow of water to the well occurs at a rate greater than the capacity of the pump. Under such conditions a large pneumatic storage tank is unnecessary with the system of my invention. However, where the capacity of the well is limited and under some other conditions of operation, the use of a large pneumatic tank for storage purposes is desirable. Under such conditions, the arrangement is as shown in Figs. 5 and 6 wherein the discharge 32 instead of being connected directly to the house service lines is connected by means of a pipe 146 to a pneumatic storage tank 147. From the tank 147 a pipe 148 connects with the house service lines.

With the arrangement shown in Figs. 5 and 6 the pressure switch may be connected to the pressure chamber 13, as shown in Figs. 1 and 2, or may be connected to the pneumatic storage tank 147. The pneumatic storage tank is supplied with air from the pressure chamber, air escaping through the tube 76 from the pressure chamber during periods when the water level is low in the pressure chamber. When a large pneumatic storage tank is used, the air supplier or air pump shown in Fig. 7 should preferably be employed for the reason that the air pump of Fig. 7 supplies an excess of air to the pressure chamber which, after there is sufficient accumulation in the pressure chamber, passes over to the pneumatic storage tank 147.

The system of my invention may be readily converted to a straight self-priming centrifugal pump should this be desired. This may be accomplished by removing the cap 56, the diffuser 37, and the nozzle 36. The nozzle 36 is then replaced by a plug and cap rethreaded in position. With this arrangement because of the plug in the position of the nozzle 36, recirculation of the liquid in the air separating chamber does not take place through the passages 33 and 34 and liquid drawn into the pump passes directly from the passage 38 to the passage 59 and thence into the eye of the impeller. Thus with simple changes in the arrangement of parts, where desired, the system may be operated as a straight self-priming centrifugal pump.

In Figs. 9-14 inclusive I have shown how the system is arranged for deep well operation. The system is converted by removing the cap 56, the diffuser 37, and the nozzle 36. The nozzle is replaced by a plug 149 and a suction pipe 151 is connected into the threaded bore 57. The casing is also provided with a threaded bore 152' which, when the pump is used for shallow well operation, is closed by a plug 153 (Fig. 4). Upon removal of the plug 153 a pressure pipe 154 is threaded into position, as shown in Fig. 12. A nozzle 156 and a diffuser 157 are connected, as shown in Fig. 13, to the pressure pipe 154 and the suction pipe 151. The system may be provided with a tail pipe, if desired, and a foot valve and strainer assembly, generally indicated by the numeral 158, may be mounted beneath the jet pump assembly, as shown in Fig. 13. In converting the system the check valve 51 is also removed and a plug 159 closes the entrance opening into the chamber 43. The strainer 44 (Fig. 4) may also be removed.

When the system is used as a deep well pump, in most cases, a pressure of liquid must be maintained in the system so as to have pressure available at the nozzle of the jet pump to supply the energy necessary to lift the water from the well and force it up the suction pipe within reach of the vacuum producing ability of the centrifugal pump.

For this purpose the discharge outlet 32 is provided with a pressure regulating valve (Fig. 11), generally indicated by the numeral 161. The pressure regulating valve comprises a valve element 162 which normally closes an opening 163 between the discharge outlet 32 and the pipe 146. The valve element 162 is connected to a valve stem 164 which operates in a casing 166. A spring 167 normally urges the valve into engagement with its seat. A diaphragm 168 is confined between a nut 169 and the valve element 162 and the lower side thereof is accessible to the pressure existent in the discharge outlet 32. The valve stem extends through an opening in the casing 166 and the annular space around the valve stem serves as a vent for air.

The spring pressure is set so as to maintain at least a minimum of pressure at the nozzle of the jet pump. This pressure should be adjusted to enable most efficient operation of the jet and centrifugal pump combination for a given well depth.

With this arrangement shown in Figs. 9-14 inclusive the tube 76 is removed from the threaded bore 73 and this opening is closed by a plug 171. The tube 76 is then connected into a threaded bore 152 provided in the body of the valve 161. This connection is on the discharged side of the valve element 162 so that the pressure in the pressure chamber 13 and the pressure in the pneumatic storage tank 147 are equalized.

With the deep well arrangement shown in Figs. 9-14 inclusive a pneumatic storage tank is usually essential. Under such conditions the pressure chamber serves primarily as a base for supporting the pump and motor. However, as previously described in connection with the shallow well arrangement of Figs. 5 and 6, air is supplied to the pneumatic storage tank from the pressure chamber.

While I have shown and described the preferred forms of my invention, it will be apparent that various changes and modifications may be made therein, particularly in the form and relations of parts without departing from the subject of my invention as set forth in the appended claims.

I claim:

1. A water system comprising, in combination, a pump, a pneumatic pressure chamber connected to the discharge of the said pump, means including a movable pressure responsive means actuated by the differential in pressure across the pump when operating and when stopped for supplying air to said pressure chamber without passing through the pump, and means connected to the pressure chamber at the normal liquid level for maintaining the water at most at said predetermined normal level when the pump is stopped.

2. A water system comprising, in combination, a pneumatic pressure chamber, a pump having an impeller for supplying liquid to said pressure chamber, means for starting and stopping the pressure pump to define a cycle of pump operation, an air supplier for said chamber, said air supplier including a movable pressure responsive element, means for actuating said pressure responsive element in response to differences in pressure between the suction and discharge of said pump during each cycle of operation and without the air passing through said pump, and means connected between the air supplier and the pressure chamber at the approximate normal liquid level therein for rendering said air supplier ineffective to supply air to said chamber when the air level therein is below said connection.

3. A water system comprising, in combination, a pneumatic pressure chamber, means including a pump for supplying liquid under pressure to the said pressure chamber, means for replenishing air absorbed by the liquid in the pressure chamber to maintain a desired liquid level in the pressure chamber comprising an air supplier having a restricted communication with the pressure chamber at the desired liquid level, said restricted communication being at all times the same in amount, a check valve providing a passage for air to said air supplier, said air supplier having a movable pressure responsive element, and means for subjecting the movable element of said air supplier to variations in pressure existing across the pressure pump during a cycle of operation in which the pump is started and stopped.

4. A water system comprising, in combination, a pressure pump, a jet pump, said system having a connection to a source of liquid supply and connections arranged so that liquid drawn from the source of supply passes through the jet pump to the suction of the pressure pump and a portion of the liquid discharged by the pressure pump returns to the jet pump for supplying energy thereto, a discharge line from said pressure pump to the point of use of the liquid, a valve between the discharge of the pressure pump and the point of use of the liquid, a pneumatic pressure chamber, and means connecting said pressure chamber to said system between the valve and the point of use of the liquid, said connection being arranged so that the major portion of the liquid is supplied to the point of use directly from the pressure pump without passing through said pressure chamber.

5. A water system comprising, in combination, a pressure pump connected to a source of liquid supply, a motor for driving said pressure pump, a discharge from said pressure pump, a pressure chamber, connecting means for enabling a flow of liquid between said pressure chamber and the discharge side of the pressure pump in either direction depending upon whether the discharge pressure of said pressure pump is higher or lower than the pressure in said pressure chamber, means for supplying air to said pressure chamber without passing through said pressure pump, a pneumatic storage tank, and means for supplying air to said pneumatic storage tank from said pressure chamber.

6. A pumping system comprising, in combination, a pneumatic pressure chamber, a pump having an impeller for supplying liquid to said chamber and defining a suction side of the system and a pressure side of the system, means for starting and stopping the pump to define a cycle of pump operation, motor means having opposite sides, one of which is exposed to the suction side of the system and the other of which is exposed to the pressure side of the system, said motor means being moved in one direction by the differential in pressure between the suction and pressure sides when the pump is operating, means for moving the motor means in the opposite direction when the pump is at rest, a movable element connected to and actuated by said motor means, said movable element having opposite sides, one of which is exposed to said pressure side of the system, said movable element having a smaller area of exposure to the pressure side of the system than said motor means, means on the other side of said movable element for drawing in atmospheric air and a restricted passage through which said air flows to said pneumatic pressure chamber, said passage being connected to said other side of the movable element at the approximate normal liquid level in said pneumatic pressure chamber, said restricted passage enabling air to flow from said pressure chamber to said other side of the movable element to render said movable element ineffective to draw in atmospheric air when the air level is at said normal liquid level.

7. A pumping system comprising, in combination, a pneumatic pressure chamber, a pump having an impeller for supplying liquid to said chamber and defining a suction side of the system and a pressure side of the system, means for starting and stopping the pump to define a cycle of pump operation, motor means having opposite sides, means for connecting one of said sides to a part of the system which when the pump is operating is always at a pressure less than the pressure to which the other side is exposed, said motor means being moved in one direction by said differential in pressure when the pump is operating, means for moving the motor means in the opposite direction when the pump is at rest, a movable element connected to and actuated by said motor means, said movable element having opposite sides, one of which is exposed to said pressure side of the system, said movable element having a smaller area of exposure to the pressure side of the system than said motor means, means on the other side of said movable element for drawing in atmospheric air and a restricted passage through which said air flows to said pneumatic pressure chamber, said passage being connected to said other side of the movable element at the approximate normal liquid level in said pneumatic pressure chamber, said restricted passage enabling air to flow from said pressure chamber to said other side of the movable element to render said movable element ineffective to draw in atmospheric air when the air level is at said normal liquid level.

8. A pumping system comprising, in combination, a pneumatic pressure chamber, a pump having an impeller for supplying liquid to said chamber and defining a suction side of the system and a pressure side of the system, a jet pump, connections for supplying liquid to said jet pump from said pressure side of the system and for discharging liquid from said jet pump to said impeller pump, means for starting and stopping the impeller pump to define a cycle of pump operation, motor means having opposite sides one of which is exposed to the suction side of the system and the other of which is exposed to the pressure side of the system, said motor means being moved in one direction by the differential in pressure between the suction and pressure sides when the impeller pump is operating, means for moving the motor means in the opposite direction when the impeller pump is at rest, a movable element connected to and actuated by said motor means, said movable element having opposite sides, one of which is exposed to said pressure side of the system, said movable element having a smaller area of exposure to the pressure side of the system than said motor means, means on the other side of said movable element for drawing in atmospheric air and a restricted passage through which said air flows to said pneumatic pressure chamber, said passage being connected to said other side of the movable element at the approximate normal liquid level in said pneumatic pressure chamber, said restricted passage enabling air to flow from said pressure chamber to said other side of the movable element to render said movable element ineffective to draw in atmospheric air when the air level is at said normal liquid level.

9. A water system comprising, in combination, a pneumatic pressure chamber, a pump having an impeller for supplying liquid to said chamber, a movable member actuated by the differential in pressure across the impeller, means including a valved connection to atmosphere actuated by said movable member for supplying air to said pneumatic pressure chamber, and means including a restricted orifice for maintaining the liquid level in said pneumatic pressure chamber at a normal level, said restricted orifice enabling air to be drawn from the pressure chamber upon operation of said movable member when the pump is started and air in the pneumatic pressure chamber has access to said restricted orifice.

10. A water system comprising, in combination, a pneumatic pressure chamber, means including a pump for supplying liquid under pressure to said chamber, means for starting and stopping the pump to define a cycle of pump operation, means for replenishing air absorbed by the liquid to maintain a desired liquid level in the chamber comprising movable pressure responsive means having a normal position, means for applying the pressure existent on the suction side of the pump to one side of said pressure responsive means and means for applying the pressure on the discharge side of the system to the other side of said pressure responsive means to actuate and move said pressure responsive means each time the pump starts, means for restoring said pressure responsive means to normal position when the pump stops, said air replenishing means having a restricted passage communicating with the pressure chamber at the desired liquid level, and a check valve providing a passage for the flow of air to said air replenishing means, said pressure responsive means drawing air through said valve into said air replenishing means when the pump starts and the liquid level in the chamber is above said orifice and forcing said air through said orifice into the chamber when the pump stops.

JOHN MANN.

REFERENCES CITED

The following references are of record in the file of this patent:

UNITED STATES PATENTS

| Number | Name | Date |
|---|---|---|
| 1,560,044 | Derrick | Nov. 3, 1925 |
| 1,938,956 | Fee | Dec. 12, 1933 |
| 2,117,563 | McMillan | May 17, 1938 |
| 2,215,815 | Hartmann | Sept. 24, 1940 |
| 2,220,209 | Carpenter | Nov. 5, 1940 |
| 2,257,507 | Mann | Sept. 30, 1941 |
| 2,291,746 | Nelson et al. | Aug. 4, 1942 |
| 2,354,811 | Jacuzzi | Aug. 1, 1944 |
| 2,435,053 | Piccardo et al. | Jan. 27, 1948 |
| 2,457,863 | Burks | Jan. 4, 1949 |